July 22, 1969  J. M. BOXLEY  3,456,363
INSTRUCTION DEVICE
Filed Aug. 25, 1966  2 Sheets-Sheet 1
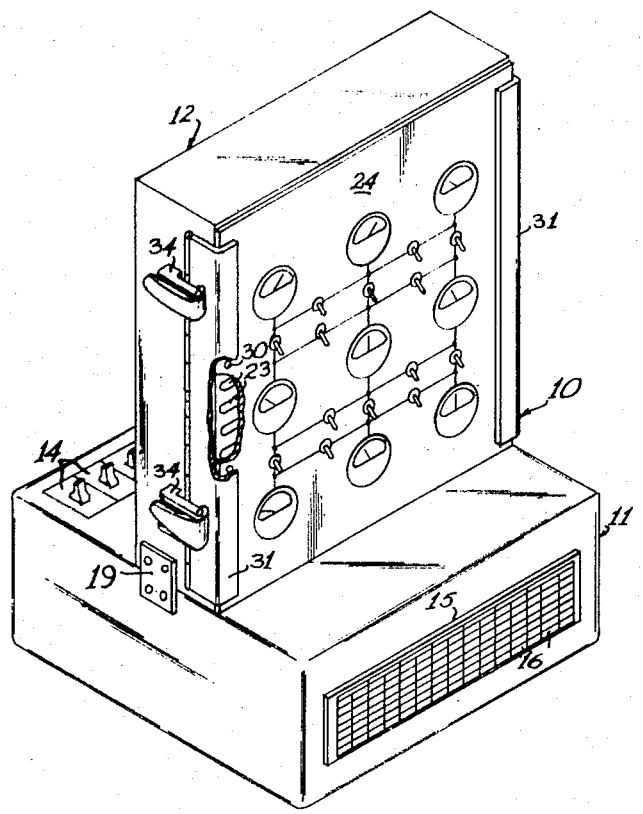
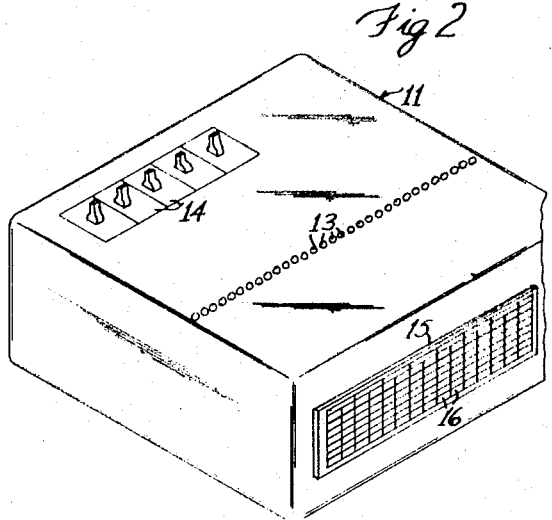
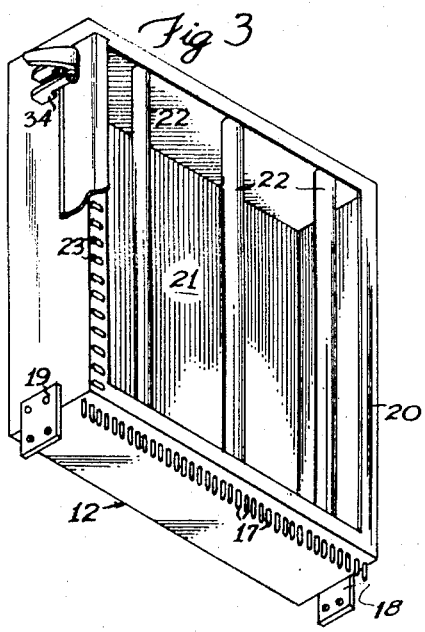
INVENTOR
Julian M. Boxley
Newton, Hopkins,
Jones & Ormsby
ATTORNEYS July 22, 1969     J. M. BOXLEY     3,456,363
INSTRUCTION DEVICE
Filed Aug. 25, 1966     2 Sheets-Sheet 2
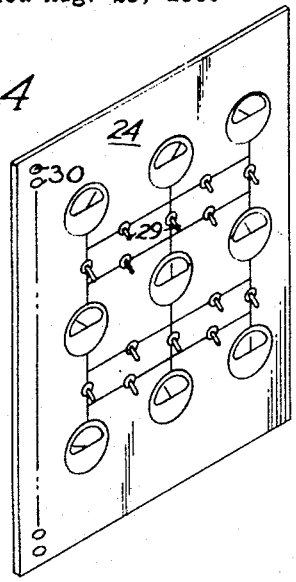
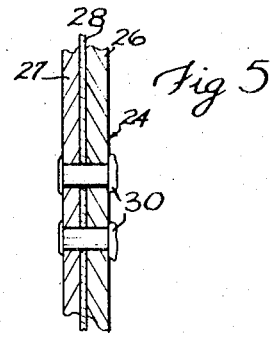
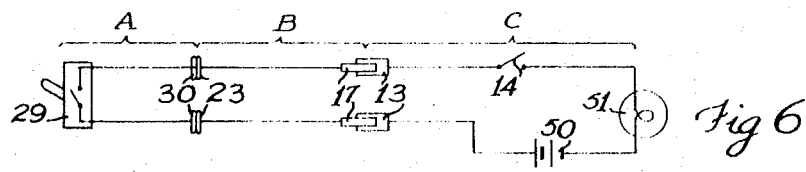
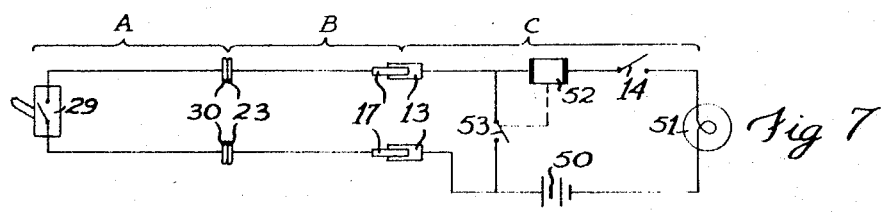
INVENTOR
Julian M. Boxley
Lawton, Hopkins,
Jones & Ormsby
ATTORNEYS

United States Patent Office 3,456,363
Patented July 22, 1969

3,456,363
INSTRUCTION DEVICE
Julian M. Boxley, East Point, Ga., assignor to Delta Air Lines, Inc., Atlanta, Ga., a corporation of Georgia
Filed Aug. 25, 1966, Ser. No. 575,096
Int. Cl. G09b 25/02, 23/00
U.S. Cl. 35—13                                   8 Claims

ABSTRACT OF THE DISCLOSURE

The present disclosure relates to a training device for use in teaching the operation of a selected system and includes an annunciator for indicating an abnormal condition upon the activation of a first electrical switching means by an instructor and a plurality of second switching means that may be selected by a student, one of which is electrically associated with the circuit that includes the first switching means and the annunciator so that when properly selected and activated by the student causes said annunciator to resume indicating normal conditions.

---

In further explanation, and merely by way of example, the concepts of the instruction devices of the present invention may be employed to train students in fields which may range from the operation of a single automated industrial process to the operation of a complete automated industrial plant and may extend to such diverse fields as the operation of an airplane. These instruction devices are not only applicable to wide areas of training but are also very versatile, as to the manner in which they may be employed during the conduct of the training. For example, the devices may be used in the classroom as training aids during lecture presentations, or alternatively, they may be used in the conduct of practical exercises by the students. In any manner of employment the present instruction devices are capable of injecting realism into the training.

Briefly described, the instruction devices encompassed by the present invention comprise a graphic representation of a flow sheet or control panel of the system to be taught, an electrical system comprising one or more electrical circuits for simulating certain conditions on the graphic representation and for recording and indicating student reaction and response, and certain controls for both an instructor and a student. With these basic elements, a student can not only be shown the overall operational steps of a particular system but may also actually perform simulated steps of starting up the system, running the system, and shutting down the system. Moreover, it is possible for the instructor to interject certain conditions into the system which necessitate some response and reaction by the student which deviate from the normal operating steps. As a result, the student may be thoroughly trained in all aspects of the operation of any particular system.

Thus, it is a first object of the present invention to provide an instruction or training device for teaching the operation of various types of systems to students.

Another object of the present invention is to provide a student with maximum visual simulation of complex learning requirements and thereby minimize the learning time.

Another object of the present invention is to provide an instruction or training device capable of simulating certain situations which might occur during operation of these systems thereby enabling a student to become familiar with these situations prior to encountering the actual situation.

It is a further object of the present invention to provide instruction devices which realistically simulate the operating centers of the systems to be taught.

Another object of the present invention is to provide an instruction device which is capable of employment for teaching various systems by merely interchanging the graphic representation on the device.

Still another object is to provide an instruction device having means to enable an instructor to inerject certain conditions or situations into the operation of a system being taught from the device.

These and other objects, features and advantages of the present invention will be more apparent from a consideration of the following detailed description of a preferred embodiment of the present invention and the accompanying drawings, in which:

FIG. 1 is a perspective view of an assembled embodiment of the present invention, partially broken away to show certain contact points between a removable instruction panel and its housing member.

FIG. 2 is a perspective view of the base member forming a part of the assembled embodiment illustrated in FIG. 1.

FIG. 3 is a perspective view of the housing member for the removable instruction panels.

FIG. 4 is a perspective view of a removable instruction panel for schematically illustrating or otherwise simulating the system to be taught.

FIG. 5 is a vertical cross sectional view of the removable panel, taken substantially along line 5—5 in FIG. 4.

FIG. 6 is a schematic view of one form of electrical circuit which may be employed in the embodiment illustrated in FIG. 1.

FIG. 7 is a schematic view of another form of electrical circuit which may also be employed.

For the purposes of clarity and understanding of the present invention, the preferred embodiment as illustrated will be discussed in connection with a system or systems for instruction in the operation of an airplane. However, it should be understood that in its broad concepts the present invention is not limited to this particular type of instruction.

Briefly, this embodiment of the present invention comprises a base member having a vertical housing member mounted thereon. These members may be separably secured together as illustrated in the drawings or they may comprise an integral unit. Removably secured to the face of the vertical housing member is an instruction panel having graphically displayed thereon a representation of the system being taught together with certain controls for operation by a student. An annunciator panel for indicating certain conditions and situations in the system is also provided and may be conveniently mounted on the base member or vertical housing member. An electrical system comprising a multitude of individual circuits is contained partially within the base member (base circuitry), partially within the vertical housing member (vertical housing circuitry), and partially within the instruction panel (panel circuitry). These individual electrical circuits become complete when the base member, the housing member, and the particular instruction panel are assembled and thereafter function together as a unit to provide simulated operating conditions to the instruction device. Certain controls for an instructor and/or student may also be conveniently provided.

Referring now to the specific structural details illustrated in the drawings, it will be seen from FIG. 1 that the instructional device 10 comprises a generally rectangular base 11 and a rectangular vertical housing member 12 having an instruction panel 24 removably mounted on the face thereof. As previously pointed out, the base 11 and the vertical housing member 12 may comprise a single, integral unit or may comprise separate units which can be removably attached. The latter embodiment is the one illustrated and to be hereinafter described.

The base 11, as shown in FIG. 2, generally comprises a box-like structure having an annunciator panel 15 mounted on its front face. The annunciator panel is divided into a plurality of rectangular areas 16 which are individually designated to represent a specific element or group of elements contained with the system being taught. For example, assuming that the instruction device is being used ot teach the ice protection system of a DC–9 airplane, the individual areas on the annunciator panel may be marked with such designations as "Air Foil-Left System," "Air Foil-Right System," "Windshield," etc. In teaching a hydraulic system some of the individual areas may be marked "Oil Pressure-Left System," "Oil Pressure-Right System," "Oil Pressure-Landing Gear," etc. Mounted behind each rectangular area on the annuciator panel is an individual light source which is connected into that portion of the electrical system contained within the base member. These light sources serve to indicate certain conditions in the system being taught. In teaching the operation of an airplane the annunciator panel will normally correspond identically with a similar annunciator panel located in the cockpit of an airplane.

It is also pointed out that the annunciator panel may be positioned elsewhere than on the base member as described above, but, in positioning the annunciator elsewhere it is preferable to maintain it in full view from the same side of the device on which the instruction panel 24 is mounted. Of course, the electrical connections to the annunciator will have to be accordingly changed as will be understood by those skilled in the art. By way of example, the annunciator panel might be appropriately positioned above the instruction panel 24 on an upper extension of the vertical housing member 12.

Mounted on the upper rear surface of the base member 11 are a plurality of switches 14 which are also connected into that portion of the electrical system contained within the base member. These switches serve as the instructor's controls and while five are illustrated in FIG. 2 they may be varied as desired and as necessary for the particular system being taught. The switches may be of any conventional type consistent with the particular function as will be explained in further detail in connection with the various types of individual electrical circuits making up the complete electrical system that forms a part of the present invention.

Since that portion of the electrical system contained in the base member 11 is incomplete and comprises only a portion of the total circuitry there are electrical hookup means provided on the upper surface of the base for easily connecting or disconnecting the base circuitry with the circuitry contained in the vertical housing member 12. It is pointed out that the vertical housing circuitry also forms only a portion of the complete electrical system similar to the base circuitry, all of which will be more apparent later in the description. Such hook-up means need only be provided in the event the base 11 and vertical housing member 12 are separate units for removable attachment.

The electrical hook-up means on the base member include a plurality of aligned female receptacles 13 extending across the upper surface of the base member in parallel relationship with the front of the base. These female receptacles receive corresponding male plug members 17 extending downward from the lower surface of the vertical housing member.

These male plug members 17 may be seen protruding downward from the lower surface of the vertical housing member in FIG. 3. As is apparent from the positioning of the female receptacles the vertical housing member 12 is mounted transversely across the upper surface of the base. The vertical housing member is secured in place on the base by means of a pair of coupling plates 18 and 19 attached to the lower sides of the housing member and extending downwardly over the corresponding sides of the base. These coupling plates are removably attached to both the vertical housing member and the base member and thereby permit easy separation of the units from each other. Of course, other types of fasteners may also be used.

The vertical housing member 12 includes an open front 20 which exposes a plurality of vertically extending light sources may be conventional fluorescent tubes having suitable mountings connected to a power source which is independent of the electrical circuitry contained in the housing member for connection with the base circuitry and the panel circuirty. The purpose of the light sources is merely to provide illumination for the instruction panel.

Disposed along a vertical front edge of the housing member 12 adjacent the open front 20 are a plurality of vertically aligned electrical contacts 23. These contacts are electrically connected by suitable wiring in some desired circuitry pattern to the male plug members 17 disposed along the lower edge of the housing member. Thus, it should be apparent that the vertical housing circuitry is formed by the electrical contact 23, the male plug members 17, and the wiring therebetween.

The electrical contacts 23 on the side of the housing member are intended to provide electrical connections with similar contacts of an instruction panel placed over the front of the housing member. As a result, the contacts 23 may be merely flat plates, however, it is preferred to employ spring-leaf type contacts of a conventional type wherein the spring-leaf portions extend angularly outward from the open front 20 of the housing member and are depressed when the contacts of the construction panel are placed against them. In this manner the corresponding contacts on an instruction panel will be assured of contact at all times with those of the housing member.

An instruction panel 24, such as illustrated in FIG. 4 is provided having dimensions which correspond with the vertical housing member and is adapted to be received over the open front 20 as shown in FIG. 1. The instruction panel is maintained in this position by a pair of L-shaped clamping bars 31 each of which is swingably mounted on a pair of lever-cam type hinges 34 on opposite sides of the open front 20 of the housing member. These lever-cam type hinges are well known in the art and therefore no further description is deemed necessary. Suffice it to say that the L-shaped clamps are permitted to swing outward when released so as to allow the instruction panel 24 to be removed from the housing member. It should be understood that other types of securing means for the instruction panels may also be employed without departing from the present invention.

Referring specifically to the construction of the instruction panels 24, it may be seen from FIGS. 4 and 5 that the panel comprises a plurality of rectangular sheets laminated together. Specifically, there is provided a rear sheet 27 which is of a light transmitting character although not necessarily transparent. A central sheet 28 is positioned adjacent the rear sheet and on whose face is printed a graphic representation of the particular system which is being taught. When teaching the operation of an airplane this graphic representation may be identical to a portion or all of the instrument panel inside of the cockpit of an airplane, a portion or all of the system involved, or a combination of each. The particular portion of the instrument panel will depend on the system being taught. Over the printed central sheet 28 lies a transparent sheet 26 thereby allowing the graphic representation to be visible therethrough. All three sheets are secured together by some suitable means which may include mechanical fasteners although it is preferred that they be laminated together using an adhesive or heat sealing process depending upon the particular materials of construction of each sheet. A laminated panel has certain advantages of rigidity and ease of handling even though it necessitates a complete panel construction for each graphic representation.

The materials of construction of the sheets comprising the panel may vary, although a plastic material is preferable due to its strength and durability. Glass may be employed in some instances. The outer sheets 26 and 27 are of a rigid nature while sheet 28 is preferably of a thin, flexible material. It is essential that sheets 27 and 28 be of a light transmitting character to permit illumination of the graphic representation while sheet 26 must be of a transparent nature to permit viewing of the graphic representation underneath.

When the instruction panel 24 is mounted over the open front 20 of the housing member 12 the light sources 22 contained therein cause the graphic representation on sheet 28 to be illuminated. Sheet 27 serves to evenly diffuse the light as it passes through the panel while transparent sheet 26 permits the illuminated graphic representation to be clearly seen from the front of the panel.

In addition to the graphic representation the instruction panel is also provided with certain control switches 29 similar to those found on the instrument panel of an airplane and appropriately located on the graphic representation. These switches extend through the front sheet 26 and may be operated by a student from the front of the panel. Moreover, indicator dials, with or without movable pointers, may also be provided.

Along a vertical edge of the instruction panel 24 are a plurality of aligned rivet-like electrical contacts 30. While these contacts are illustrated as extending entirely through the panel it should be understood that it is only necessary that the contacts extend from the central sheet 28 through the rear sheet 27 since the panel circuitry is normally behind the central sheet 28. These electrical contacts are spaced apart from each other a distance equal to the spacing between the contacts 23 of the housing member 12. In this manner both sets of electrical contacts will be aligned and in abutting relationship when the panel 24 is clamped over the open front of the housing member.

While the sets of corresponding contacts 23 and 30 have been illustrated and described as being positioned solely along a vertical edge it is emphasized that they may be positioned along any other edge or even along more than one edge. Moreover, it is entirely possible that the contacts 23 be positioned and mounted intermediately of the side edges of the vertical housing member 12 and the contacts 30 be appropriately positioned in corresponding areas of the instruction panel. The essential feature contemplated by the present invention is that the contacts 23 and 30 be aligned and placed in abutting relationship when the panel 24 is clamped onto the vertical housing member.

As previously pointed out, the instruction panel 24 also contains a portion of the electrical system of the device. This panel circuitry is formed by wiring the various switches 29 to certain of the electrical contacts 30 at the edge of the panel. In particular, this wiring may be embedded in the panel as for example laminated between the central sheet and rear sheet. Alternatively, this wiring may be formed by a printed circuit constructed as an integral part of the central sheet 28. In either event, it is preferable that the wiring be virtually invisible from the front of the panel.

In the embodiment of the instructional device described above it was pointed out that the overall electrical system was formed by a group of individual conventional circuits, each circuit being designed to indicate certain conditions on the annunciator panel and may or may not be responsive to certain switches on the panel and on the rear of the base member. The total function of the electrical system is to simulate the actual operation of that portion of an airplane instrument panel and/or aircraft system which correspond to the particular system or systems being taught.

The design of the individual circuits will be readily understood by those skilled in the art once the particular conditions desired to be presented on the instructional device are determined. These conditions, of course, will vary according to the system being taught and the controls desired by the instructor.

By way of example, two types of these individual circuits are illustrated in FIGS. 6 and 7. As may be generally noted therein each circuit may be broken down into three parts A, B, and C. Part A represents that portion of the circuit which has been incorporated into the instruction panel 24, Part B represents that portion of the circuit contained in the vertical housing member 12 and Part C represents that portion of the circuit contained in the base member 11. Part A is shown electrically connected to Part B as a result of placing contacts 30 of the instruction panel against contacts 23 of the vertical housing member. Part B is shown electrically connected to Part C as a result of inserting male plug members 17 of the vertical housing into female receptacles 13 of the base member. Thusly connected, each individual circuit is complete and ready for operation.

A source of power 50 is illustrated in both FIGS. 6 and 7 as being part of the base circuitry C, however, it should be understood that it may also be located elsewhere in the circuit. This source of power may be a conventional cord and plug member adapted to be placed into a wall-type outlet found in buildings. On the other hand, it may comprise a conventional battery arrangement thereby rendering the instructional device portable.

Referring specifically to FIG. 6, the circuit is shown as comprising a switch 29, located on the instruction panel an instructor's switch 14', located at the rear of the base member, and a light source 51 located behind one of the rectangular areas 16 on the annunciator panel 15. This type of circuit may be employed in the following manner: switch 29 is in a normally closed condition, switch 14' is in a normally open condition and the light source 51 is unilluminated thereby indicating a normal condition on the annunciator; it having been previously determined that the element of the system being taught, and represented by the particular rectangular area 16 behind which light source 51 is positioned, is operating normally when the light source is unilluminated. Now then, during the instruction the instructor may decide to place a malfunction or abnormal condition in this element of the system being taught in which case he merely closes his control switch 14. This immediately produces illumination in the light source 51 behind the particular rectangular area 16 of the annunciator and informs the student that an abnormal condition exists. The student then checks the designation of the particular illuminated rectangular area to determine the element of the system which is operating in an abnormal manner. After making this determination, the student next refers to the instruction panel having the graphic representation of an instrument panel thereon and locates the proper switch 29 to correct the abormal operation. In the event the student locates and actuates the proper switch 29 the circuit will again be broken and the light source 51 will become unilluminated thereby indicating normal operating conditions again. On the other hand, if an improper switch is selected the student himself may inject another abnormal condition or malfunction.

It should be understood that in an actual system corresponding to the one being taught the above proper response by the student will produce some electrical or mechanical function in the system that has the effect of correcting the abnormal condition.

Next, with reference to FIG. 7, there is shown another type of circuit which may be employed in the present invention. This circuit is similar to that shown in FIG. 6 with the exception of that the base circuitry C is provided with a solenoid 52 and a by-pass switch 53 placed in a line conductor by-passing the student's switch 29. The by-pass switch 53 is actuated by the solenoid 52.

In operation, this circuit indicates a normal operating condition of an element of the system being taught when the light source 51 is unilluminated just as in the circuit shown in FIG. 6. When the instructor actuates switch 14 to inject a malfunction or abnormal condition the circuit is completed thus illuminating the light source 51 on the annunciator and thereby informing the student of such condition in the system being taught. However, when switch 14 is closed by the instructor solenoid 52 is also activated and, in turn, actuates switch 53 thereby completing the circuit formed by the line conductor by-passing the student's switch 29. Thus, when the student performs the previously described procedure of locating and actuating the proper switch 29 on the instruction panel he is unable to break the circuit to the light source 51 and cause it to go out to restore normal operating conditions to the particular element of the system. The abnormal condition injected by the instructor in this instance is therefore considered to be of the non-correctable type and requires the student to determine whether the complete system should be shut down or to continue operation due to the minor nature of the abnormal operating condition.

While the above two general types of circuits have been described with reference to abnormal operating conditions it is pointed out that these are also intended to include those which may be classified as emergency conditions.

It should be understood that the above described circuits are merely by way of example it being within the skill of the art to devise other types of circuits which may also be employed in the present invention. In particular, it may well include circuits wherein the light sources 51 are illuminated to indicate normal operating conditions.

Thus, having described the present invention, it is intended that the invention not be limited nor confined to the specific structural details here presented, and thus numerous changes, modifications, and the full use of equivalents may be resorted to in the practice of the invention without departing from the spirit or scope thereof as defined in the appended claims.

I claim:

1. An instruction device for teaching the operation of a system comprising a base, a vertical housing member on said base, and a panel member removably mounted on the front of said vertical housing member and having graphically displayed thereon the system being taught; said device being provided with an annunciator that is positioned before a student for indicating normal and abnormal operating conditions of the system displayed on said panel member, first means electrically associated with said annunciator and operable by an instructor for causing said annunciator to indicate abnormal operating conditions, a plurality of second means one of which is electrically associated with the circuit that includes said first means and said annunciator so that when properly selected and activated by a student causes said annunciator to resume indicating normal operating conditions, said annunciator comprising a grid-like panel having a light source mounted behind each grid subdivision, some of said light sources indicating normal operating conditions when illuminated and some of said light sources indicating abnormal operating conditions when illuminated, the light sources of said annunciator being electrically connected in a plurality of electrical circuits, at least some of said circuits being formed in three portions which are releasably electrically connected together, the first portion being contained in said base, the second portion being contained in said vertical housing member, and the third portion being contained in said panel member.

2. An instruction device according to claim 1 wherein said vertical housing member is removably mounted on said base and said first portion of the electrical circuits and said second portion of the electrical circuits are releasably electrically connected together by means of male plug members received in female receptacles.

3. An instruction device according to claim 1 wherein said first means comprise a plurality of electrical switches electrically connected to at least some of said eletrical circuits of said first portion.

4. An instruction device according to claim 1 wherein said second means comprise a plurality of electrical switches mounted on said panel member and electrically connected to at least some of said electrical circuits of said third portion.

5. An instruction device according to claim 1 wherein said second portion of electrical circuits and said third portion of electrical circuits are releasably electrically connected together by a series of spaced apart first contacts on said vertical housing member and a corresponding series of spaced apart second contacts on said panel member when said panel member is mounted on the front of said vertical housing member.

6. An instruction device according to claim 5 wherein there are provided a plurality of interchangeable panel members each of which is provided with a different system graphically displayed thereon.

7. An instruction device according to claim 5 wherein said third portion of the electrical circuits comprises a printed circuit.

8. An instruction device according to claim 5 wherein said first contacts are arranged in vertical alignment along one edge of said vertical housing member and said second contacts are arranged in vertical alignment along one edge of said panel member.

References Cited

UNITED STATES PATENTS

| 2,788,470 | 4/1957 | Giel et al. | 35—19.1 X |
| 3,058,663 | 10/1962 | Barnard. | |
| 3,061,945 | 11/1962 | Hawkins | 35—13 |
| 3,146,533 | 9/1964 | Carmody et al. | 35—13 |
| 3,237,318 | 3/1966 | Schager | 35—13 |
| 3,309,793 | 3/1967 | Bartee | 35—10 |
| 3,310,883 | 3/1967 | Young | 35—10 |
| 3,340,620 | 9/1967 | Meade | 35—10 |

FOREIGN PATENTS 480,404   4/1953   Italy.

EUGENE R. CAPOZIO, Primary Examiner

W. W. NIELSEN, Assistant Examiner

U.S. Cl. X.R.

35—10